United States Patent
Mason et al.

(10) Patent No.: US 6,780,228 B2
(45) Date of Patent: Aug. 24, 2004

(54) POLISH COMPOSITIONS AND METHOD OF USE

(76) Inventors: John Clifton Mason, 103 Fowler St., Carrboro, NC (US) 27510; Michael Gates Kinnaird, 3612 Courtland Dr., Durham, NC (US) 27707

( * ) Notice: Subject to any disclaimer, the term of this patent is extended or adjusted under 35 U.S.C. 154(b) by 252 days.

(21) Appl. No.: 09/848,666

(22) Filed: Aug. 16, 2001

(65) Prior Publication Data

US 2003/0041773 A1 Mar. 6, 2003

(51) Int. Cl.⁷ ................................................ C09G 1/08
(52) U.S. Cl. ........................ 106/10; 106/8; 106/9; 106/11; 106/252; 106/245; 106/265; 106/271; 510/214; 510/217; 510/242; 510/254; 510/275
(58) Field of Search ............................ 106/8, 9, 10, 11, 106/252, 245, 265, 271; 510/214, 217, 242, 245, 275

(56) References Cited

U.S. PATENT DOCUMENTS

| | | | | |
|---|---|---|---|---|
| 2,483,259 A | * | 9/1949 | Budner et al. | 106/245 |
| 3,953,217 A | | 4/1976 | Goracke | 106/8 |
| 4,732,611 A | | 3/1988 | Raney | 106/9 |
| 4,804,413 A | | 2/1989 | Lee | 106/10 |
| 5,045,113 A | | 9/1991 | Grant | 106/10 |
| 6,358,623 B1 | * | 3/2002 | Fukushima | 428/543 |

* cited by examiner

Primary Examiner—C. Melissa Koslow

(57) ABSTRACT

An improved self-cleaning polish is obtained by adding a wax to an oil either pre-heated, or then subsequently heated, with stirring. Subsequently, and optionally, water and/or an acetic acid source, preferably vinegar, is added, either before or after partly or completely cooling the heated wax/oil mixture. Special-purpose additives may be added, such as salts, abrasives, suspending aids, preservatives, emulsifiers, colorants, fragrances, etc. However, no solvent other than the oil is necessary, a decided improvement over existing technology.

14 Claims, No Drawings

POLISH COMPOSITIONS AND METHOD OF USE

BACKGROUND OF THE INVENTION

This invention relates to a novel class of polish compositions, preferably essentially of natural origin and free of synthetic or natural-origin volatile solvents, as well as of silicones, polymers, and the like. It further relates to a method of utilizing them which entails swabbing, rolling, brushing or spraying them on to a substrate to be polished, waiting some time, then rubbing, swabbing, or wiping off the excess, and polishing the article with the remainder.

It is well-known that the longevity, beauty, appearance, resistance to marring, water damage, etc. of many objects are enhanced by polishing them. Such objects commonly polished for these reasons include furniture, cars, doors, floors, shoes and other leather articles, etc. A great deal of scientific development has occurred in the polish field, with many patents being issued, trade secrets kept, etc. The current trend in this regard is to include silicones and/or other polymers, and other high-technology additives. As a result, novel polishes have some outstanding properties and abilities in regards to enhancing the longevity, beauty, appearance, resistance to marring, water damage, etc.

Unfortunately, virtually all of these polishes involve synthetic or naturally-derived volatile solvents, polymers and other additives. Petroleum-derived solvents in particular have some singular disadvantages with regards to toxicity to humans and the environment. Therefore, from a toxicity standpoint, if a polish could be obtained that does not entail use of these synthetic solvents, polymers, etc., it would be an improvement over the current situation.

Likewise, many solvents, petroleum-derived or of natural origin have a marked deleterious effect on human skin. Even many naturally-derived solvents such as turpentine, a classic ingredient in many furniture polishes, has some disadvantages such as objectionable odors. Thus even naturally-derived solvents have disadvantages, and it could be advantageous to formulated polishes without them.

Also, many polish formulations contain tacky viscous liquid polymers, which remain on the surface of the polished article. Due to the tacky, viscous liquid nature of these materials, the resulting films will tend to be adherent to airborn particulates, causing them to stick to the polished article, actually rendering it dirty faster than if it had not been polished at all, but merely wiped free of dirt. This is a "re-soiling" problem.

Furthermore, a polish that can act simultaneously as a cleaner is desirable, and is sometimes the object of the efforts of polish developers. A dilute acetic acid source, frequently vinegar is a common additive to try to make a cleaner which also simultaneously polishes.

Some attempts have been made in the direction of utilizing natural-origin materials in polishes. For example, U.S. Pat. No. 4,804,413 to Lee discloses a polish comprising, among other things, turpentine oil as a solvent. Unfortunately, this invention also includes petroleum jelly, and silicone polymers, making it a less-than-desirable polish from toxicity and re-soiling points of view.

Another attempt along these lines is U.S. Pat. No. 4,732,611 to Raney, which utilizes vinegar, turpentine and an oleoresin such as boiled linseed oil, in roughly equal proportions. This invention does not utilize petroleum-based ingredients, and comprises natural-origin materials, but suffers from several drawbacks. Turpentine has a strong odor that many find objectionable. Likewise, it is not a persistent material, so provides little of value to the formulation from the point of view of the longevity of the resultant shine, which is stated to last only about three months. Finally, the emulsion is unstable, needing to be shaken frequently during use. A formulation like Raney, but utilizing a wax, and which is more stable, would be preferrable.

A similar attempt is U.S. Pat. No. 3,953,217 to Goracke. Goracke discloses a polish which contains calcium oxide, sodium bicarbonate, boric acid, tung oil isoamyl acetate and turpentine. This composition suffers from potential flammability problems due to the presence of isoamyl acetate and turpentine, and has the objectionable odor problem of Raney, as well as the presence of ingredients that do not directly contribute to polishing, resulting in added complexity. Although Goracke does not teach so, it is likely that without any kind of suspending aids, the insoluble salts will rapidly settle to the bottom, leading to a formulation which also needs shaking to be optimally efficacious. Likewise, lacking a wax component, Goracke will probably also result in poor longevity of the shine on the polished article. Finally, it is known in the art that including an acetic acid source such as vinegar to a polish formulation will improve it's cleaning performance. Goracke lacks this, and so an improved cleaning ability is desirable.

U.S. Pat. No. 5,045,113 to Grant discloses a polish composition which includes wax, but also includes turpentine and white spirit, and a complex alum salt exemplified by potassium aluminum sulfate or alum, optionally and preferably with other ingredients such as a vegetable or mineral oil, acetic acid, resin and bluestone as an abrasive. Although Grant does contain wax, it also contains the objectionable solvents turpentine and white spirit, with the drawbacks mentioned above. Also, like Goracke, Grant includes an insoluble salt without a dispersing aid, resulting in the likely need to shake prior to use, and presumably during use, depending on how thin the resulting material is. Therefore, a simpler, solvent-free formulation which is stable, and does not need to be shaken prior to or during use, but which nonetheless involves primarily or exclusively natural-origin materials is preferable.

It is the object of this invention to solve the above problems utilizing a simple formulation without utilizing solvents, said formulation in one embodiment comprising a wax and an oil. It is another object of this invention to provide a polish that can simultaneously clean as well as polish. This kind of polish comprises in addition to the wax and oil, a water and/or an acetic acid source, preferably vinegar. It is surprisingly found that effective, stable polishes can be made with the above ingredients alone. It is to be understood that the above minimal polishes can optionally be formulated with added special-purpose ingredients. These and other objects will become apparent due to the examples and specifications below.

DESCRIPTION

It is the object of this invention to utilize a simple formulation without utilizing solvents, said formulation comprising in one embodiment a wax, an oil, and in another also an acetic acid source, preferably vinegar, optionally with an added salt, among other special-purpose ingredients. This invention is surprisingly stable, the formulations encompassing a range of viscosities from viscous, pourable lotion-like liquids to semi-pasty but generally pourable liquids, to stiff waxy-type compositions, all of which are storage stable as is, and usually need no shaking prior to or during use. No solvent is necessary to dissolve the wax.

A wax is merely added with stirring into a heated oil, which is then either cooled to room temperature and packaged, or cooled somewhat and vinegar or some other acetic acid source mixed. Special-purpose ingredients may be added, and their place in the order of addition will depend on their nature, whether they are water- or oil-soluble, for example. The product is then ready to package. The temperature at which packaging commences depends on the consistency of the product. Products which are stiff pastes at room temperature are best packaged at elevated temperatures. Products which are viscous, lotion-like liquids may be packaged at room temperature or somewhat above.

There are many advantages to this invention, not the least of which is the relative simplicity of the formulations, without the long lists of ingredients commonly associated with many polish formulations. With a minimal formulation of as few as two or three ingredients, a polish is obtained. If it is desirable to obtain a polish which also cleans in one step, as few as three ingredients may be used. No toxic or objectionable solvents are required, which also greatly reduces flammability and toxicity concerns. When used, the water, acetic acid or vinegar gives the formulation good cleaning power on certain types of soils, compared to formulations without them. The wax results in long-lasting shine and water protection. When formulated without them, the lack of surface active emulsifiers reduces the water-sensitivity of the resultant film.

Optionally, but not necessarily, ingredients may be added such as salts, abrasives, suspending agents for the abrasives, special emulsifiers, fragrances, preservatives, colorants, and so on for some special purposes. It is to be understood that formulations utilizing this invention and such optional additives fall within the scope of the instant invention.

Waxes that find utility in his invention include, but are not limited to: beeswax, candelilla wax, carnauba wax, ozokerite wax, ceresine wax, orange wax or any other naturally-derived wax, and/or mixtures or combinations of two or more of these. In a preferred embodiment the wax is beeswax. In another preferred embodiment, the wax is carnauba wax. In another preferred embodiment, the wax is a mixture of these two.

There are some notable examples of natural-origin waxes that have been modified to give them advantageous properties. Examples are the so-called "ethoxylated waxes", such as ethoxylated beeswax and ethoxylated carnauba wax. These modified waxes have emulsification abilities, and so can be used to advantage as a part or all of the wax in the instant invention. This kind of wax additive can stabilize thinner, less-viscous formulations without adding toxic ingredients.

It may be desirable for various reasons, to utilize a synthetic wax, although this is not preferable. However, most synthetic waxes do not suffer from toxicity concerns, so it may be conceivable that it may be advantageous to use one or more synthetic wax, alone or in combination with one or more natural-origin wax. Likewise, many natural-origin waxes have synthetic versions which are substantially similar to the natural-origin versions. Therefore, synthetic waxes may find utility in the instant invention. Such synthetic waxes should preferably be at least partially soluble in the oil component, when heated to a temperature that is not deleterious to the oil.

The wax or waxes should comprise from about 1 to about 70% by weight of the formulation. Hereinafter, "%" means percent by weight of the formulation. It is preferable that the wax be in the range of about 5 to about 25%, due to an increase in viscosity at higher concentrations.

The oil can be and is preferably a natural-origin oil, or in a non-preferred embodiment, a synthetic oil. The preferred embodiment is decidedly the use of a natural-origin oil. The oil is the major carrier of the other ingredients in this invention, and so comprises from about 50 to about 99% of the formulation. In a preferred embodiment, the oil comprises from about 70 to about 90% of the formulation, regardless of the source or sources of the oil or oils.

In another preferred embodiment, the oil can be the carrier of the wax and water-insoluble components, but emulsified in a substantial relative amount of a water-based liquid. In this situation, the oil could comprise from about 20 to about 70 percent of the formulation.

The oils that find utility in the present invention are primarily non-drying types of natural oils. An inclusive but not exhaustive list of oils that find utility in this invention is soybean, neatsfoot, olive, sunflower, canola, cocoanut, cottonseed, rapeseed and corn. There may be times when drying oils such as tung or linseed oils may find utility in the present invention. Such oils can add toughness to films containing them, but can also suffer from self-gelling in the package, and so are not preferred. The present invention envisions formulations with drying oils alone, or in combination with one or more non-drying oil.

Although it should be understood that synthetic oils may be utilized in the instant invention, toxicity and other concerns make them a non-preferred embodiment. However, the ease of formulation, low cost and other characteristics may make formulations involving synthetic oils desirable under certain circumstances. Therefore, synthetic oils exemplified by mineral oil or mineral seal oils may find utility in the present invention, and the invention can be practiced with them as well in the absence of the traditional solvents utilized in polishes containing them. Other synthetic oils may also find utility in this invention.

For special purposes, some of the fatty acids comprising a natural-origin oil or a part of the oil may be split off from the glycerin backbone and re-esterified to other alcohols prior to formulating with them. Example of such alternative alcohols for the glycerine that is the backbone of natural-origin oils are methyl- ethyl- isopropyl, propyl, butyl, or other alcohol.

Likewise, in some thinner formulations, an emulsifying agent can add stability to the formulation. In a preferred embodiment, this emulsifying agent is a kind of modified oil, which is the result of adding excess glycerine to an oil or lard, or some other naturally-derived triglyceride, followed by a re-esterification to yield a product with emulsification abilities, such as glycerine mono-stearate, or -mono-oleate. These naturally-derived emulsifiers can find utility in the present invention in proportions of about 0.1–10%. Other preferred-embodiment emulsifiers include, but are not limited to: sorbitan esters and/or sorbitan ester ethoxylates or some other carbohydrate-derived emulsifier, polyethylene glycol esters of fatty acids, alkanolamides, fatty acid salts, ethoxylated- or otherwise modified natural-origin waxes, and the like. The major defining characteristic of these preferred emulsifiers is that much or the majority of the material is of natural origin, that the product be readily biodegradable, and that the human and terrestrial animal toxicity be low. These emulsifiers, either alone or in combination, are added to the formulation at levels of about 0.1–10%, although higher concentrations may be necessary for some specialized purposes.

As is known in the art, polishing and cleaning formulations are frequently improved by adding water, sometimes containing acetic acid, frequently in the form of vinegar. In one embodiment, this invention also contains acetic acid, also preferably with vinegar as the source. Due to the unique nature of the combination of ingredients, no stabilizer or emulsifier is usually necessary to stably disperse the vinegar or other acetic acid source. Even if the resulting dispersion/emulsion is not stable, experience has shown that complete dispersion/emulsion is readily re-obtained by briefly shaking, and the resulting emulsion is typically stable for hours, thus facilitating application. As mentioned above, it may be desirable to include an emulsifier to stabilize the resulting dispersion/emulsion, so no shaking is necessary.

The acetic acid source should comprise from about 0.1% to about 70% of the formulation. Acetic acid should comprise from about 1% to about 99% of the acetic acid source. Vinegar is the preferred embodiment. A representative but not exhaustive list of applicable vinegar types is apple cider vinegar, white vinegar, distilled vinegar, wine vinegar, balsamic vinegar, and/or mixtures and combinations of these.

Alternatively, a vinegar-free emulsion can be conceivably be useful in this invention, for specialized cleaning/polishing applications. In this embodiment, the water should also comprise from about 0.1 to about 70% of the formulation. If a vinegar-free formulation is used, then preservatives may be necessary.

Abrasives are frequently added to cleaners to improve their scrubbing ability. Although not necessary, water-soluble or partially-water-soluble salts can serve as mild abrasives in many applications, with the added advantage that these materials can enhance the shininess of dulled brass or other metals when they are polished. Therefore, the polish of the instant invention can contain a salt, being at least one selected from the group which is represented by, but not limited to: sodium chloride, lithium chloride, potassium chloride, calcium chloride, calcium carbonate, calcium bicarbonate, calcium oxide, calcium sulfate, magnesium chloride, magnesium carbonate, magnesium sulfate, sodium carbonate, sodium bicarbonate, sodium percarbonate, sodium borate, sodium perborate, barium chloride, barium carbonate, and/or mixtures and/or combinations of these. The salt, when added to the formulation, should comprise from about 0.1 to about 90%.

Likewise, although decidedly not a preferred embodiment, the composition of this invention can contain clay or clays, talc, silica or silicas, alumina, calcium magnesium silicates, garnet, mica or some other abrasive. The formulations of the instant invention are rather viscous, semi-pastes, and so these materials and the abrasives listed above stay suspended without the need of added suspending agents. Polishes containing clays, talc, etc do, however suffer from the disadvantage that the residue will be white and therefore objectionable. These are therefore not preferred embodiments. The insoluble abrasive, when added to the formulation, should comprise from about 0.1 to about 90%.

The polishes of the instant invention are useful for cleaning and/or polishing a wide variety of objects, nearly anything that is normally polished. Examples of the types of objects that are usefully cleaned and/or polished with the instant invention include, but are not limited to:

wooden furniture or fixtures, doors and/or doorframes, window sills and frames, and other similar varnished, oiled, treated, coated, painted or unpainted and untreated wood or wood composition surfaces, wood, parquet, linoleum and other flooring materials on floors including, but not limited to varnished, sealed, coated, painted and/or unfinished wood, brass, copper, stainless or carbon steel, wrought-, cast- or other forms of iron or other metal and combination metal composition articles, said metal articles to include but not be limited to: door knobs, lock frames, hinges and window frames; window accessories; furniture handles, corner protectors, window frames, legs, and the like; cast iron skillets and/or cookware; also including metal on cars and boats, cars, boats, surfboards, skateboards, motorcycles, bicycles, skis and the like.

These and other preferred embodiments are disclosed and exemplified by the formulations delineated in the following examples.

EXAMPLES

Example 1

Example 1 indicates that a useful polish can be formulated with only a wax and an oil.

Raw Beeswax, 1.4 parts by weight (hereinafter referred to as "parts"), was added to 8 parts extra virgin olive oil, and the mixture heated and stirred gently to a temperature of around 190 degrees Farhenheit (hereinafter "F."), at which time virtually all of the wax had dissolved. The mixture was mixed vigorously with a dual-blade mixer and cooled to about 95 F., at which time it was a very thick lotion-like material. Viscosity increased somewhat upon further cooling in the storage container. The resultant material will polish various articles if rubbed on, left on the article for varying lengths of time, and then buffed with a clean cloth or paper towel.

Examples 2–5

Examples 2–5 indicate that varying the amount of wax added to a formulation will give a product with widely varying viscosities. All have vinegar added and therefore clean and polish in one step. All leave surfaces shiny, and if porous, the substrate is moistened with the oil/wax mixture.

The procedure of Example 1 was repeated, except that the wax/oil mixtures were generally cooled to at least below 150 F. before adding the vinegar. The mixing and cooling were continued until the mixtures were close to room temperature, at which time they were transferred to storage containers. Generally, the viscosities increased upon further cooling/aging in the storage containers. Each utilized white, distilled vinegar, raw beeswax and extra virgin olive oil.

| Example | Parts Wax | Parts Oil | Parts Vinegar | Result |
| --- | --- | --- | --- | --- |
| 2 | 14 | 227 | 14 | Thick, creamy lotion-like liquid |
| 3 | 28 | 186 | 14 | Highly-viscous opaque cream |
| 4 | 56 | 186 | 14 | Consistency of cake icing |
| 5 | 14 | 224 | 28 | Thick, creamy lotion-like liquid |

Example 6

Example 6 shows that oils other than olive oil are effective in this invention.

The procedure of examples 2–5 was repeated, except that 14 parts beeswax was added to 186 parts premium peanut oil, and after heating/dissolution, 14 parts of vinegar were added with vigorous mixing as above, the mixture being cooled while mixing. The result is also a viscous liquid with a lotion-like consistency, but the viscosity is noticeably thinner than the corresponding recipe utilizing olive oil.

Examples 7–14

Examples 7–14 indicate that a variety of different oils, waxes, and other materials are useful in this invention.

Example 7

The procedure of examples 2–5 was repeated, except that 14 parts carnauba wax was added to 188 parts virgin olive oil, and after heating/dissolution, 14 parts of vinegar were added with vigorous mixing as above, the mixture being cooled while mixing. The result is also a viscous liquid with a lotion-like consistency.

Example 8

The procedure of examples 2–5 was repeated, except that 14 parts of "Gulfwax" paraffin wax was added to 186 parts virgin olive oil, and after heating/dissolution, 14 parts of vinegar were added with vigorous mixing as above, the mixture being cooled while mixing. The result is also a viscous liquid with a lotion-like consistency. The stability of this dispersion/emulsion is less than that of the beeswax/olive oil/vinegar formulations, but complete dispersion/emulsion is easily re-obtained by brief shaking. This stability lasts for several hours.

Example 9

The procedure of examples 2–5 was repeated, except that 104 parts of "Gulfwax" paraffin wax was added to 188 parts mineral oil, and after heating/dissolution, 20 parts of vinegar were added with vigorous mixing as above, the mixture being cooled while mixing. The result is a stiff pasty material, almost like butter.

Example 10

The procedure of examples 2–5 was repeated, except that 14 parts of raw beeswax was added to 186 parts of extra virgin olive oil, and after heating/dissolution, 10 parts of vinegar and 4 parts of vinegar in which were pickled hot peppers ("pepper vinegar") were added with vigorous mixing as above, the mixture being cooled while mixing. The result is also a viscous liquid with a lotion-like consistency. This formulation, when rubbed on objects that dogs are in the habit of biting, will prevent dogs from biting the object afterwards, and apparently have a sufficiently-severe deterrency that the habit is broken permanently.

Example 11

The procedure of examples 2–5 was repeated, except that 14 parts of raw beeswax was added to 186 parts of extra virgin olive oil, and after heating/dissolution, 14 parts of vinegar were added with vigorous mixing as above, the mixture being cooled while mixing. When the mixture was substantially cooled, 4 parts of baking soda were added. The result is also a viscous liquid with a lotion-like consistency. This formulation has some abrasiveness to it, so as to be able to remove difficult, stuck soils during the rubbing phase. The excess baking soda can be removed with a damp cloth at the end of the application/rubdown procedure if necessary, although in practice this has not been necessary.

Example 12

The procedure of examples 2–5 was repeated, except that 14 parts of raw beeswax was added to 186 parts of extra virgin olive oil, and after heating/dissolution, the whole was vigorously mixed as above, the mixture being cooled while mixing. When the mixture was substantially cooled, 12 parts of baking soda were added. The result is also a viscous liquid with a lotion-like consistency. This formulation has some abrasiveness to it, so as to be able to remove difficult, stuck soils during the rubbing phase.

Example 13

Example 13 indicates that a high loading of an abrasive formulates a useful buffing polish.

The procedure of examples 2–5 was repeated, except that 56 parts of raw beeswax was added to 372 parts of extra virgin olive oil, and after heating/dissolution, the whole was vigorously mixed as above, the mixture being cooled while mixing. While the mixture was being cooled, 500 parts of baking soda were added. The result is also a viscous liquid with a lotion-like consistency. This formulation has abrasiveness to it, so as to be able to remove difficult, stuck soils, and smooth down rough surfaces during the rubbing phase.

Example 14

Example 14 indicates that adding an emulsifier can make a cleaning polish with a creamier lotion-like consistency.

The procedure of examples 2–5 was repeated, except that 14 parts of raw beeswax and 4 parts of an ethoxylated beeswax with about 3 moles of ethylene oxide added per mole of beeswax ("PEG-3 Beeswax") were added to 186 parts of extra virgin olive oil, and after heating/dissolution, the whole was vigorously mixed as above, the mixture being cooled while mixing. When the mixture was somewhat cooled, 14 parts of distilled vinegar were added. The result is also a viscous liquid with more of a creamy, lotion-like consistency than the formulations without the PEG-3 beeswax.

We claim:

1. Solvent-free polish compositions useful for a wide variety of cleaning and/or polishing operations including but not limited to cleaning and/or polishing wooden furniture and household fixtures, doors, window sills and the like, and other wood and metal objects, floors, including wood, and composition floors, cars, boats, and the like, shoes and other leather articles; said polishing compositions consisting essentially of:

A. A wax, preferably of natural origin, said wax comprising from about 1 percent by weight ("%") to about 70% of the total formulation, B. A non-drying natural-origin oil, said oil comprising from about 20% to about 99% of the formulation, said oil being selected from the group consisting of olive, peanut, rapeseed (canola), coconut, soybean, neatsfoot, sunflower, cottonseed, corn, and mixtures and combination of these, C. vinegar or acetic acid diluted with water so as to contain approximately the same amount of acetic acid as a type of vinegar, and D. Other useful optional potential additives for specific purposes, including abrasives, emulsifiers, thickeners, preservatives, colorants, fragrances, and the like.

2. The composition of claim 1, where the vinegar or diluted acetic acid is from about 0.1% to about 70% of the formulation.

3. The compositions of claims 1 or claim 2 wherein the wax is a wax of natural origin, said wax being at least one selected from the group containing beeswax, candelilla wax, carnauba wax, ozokerite wax, ceresine wax, orange wax or any other naturally-derived wax, and/or mixtures or combinations of two or more of these.

4. The compositions of claim 1 or claim 2 wherein the wax is a paraffin wax or other synthetic wax or combination of synthetic waxes which wax or combination of synthetic waxes is at least partially soluble in the oil when it is hot.

5. The compositions of claim 1 or claim 2 wherein the wax is a blend of at least one natural origin wax and at least one synthetic wax.

6. The compositions of claim 1 or claim 2, wherein the glycerin in the non-drying oil is at least partially substituted by an alcohol.

7. The compositions of claim 1 or claim 2 wherein the vinegar is selected from the group consisting of: apple cider vinegar, white vinegar, distilled vinegar, wine vinegar, balsamic vinegar, and/or mixtures and combinations of these.

8. The compositions of claim 1 or claim 2 wherein the abrasive is present in an amount of about 0.1 to about 90% of the composition.

9. The compositions of claim 1 or claim 2 wherein the resulting cleaner/polish is useful for cleaning and/or polishing wooden furniture or fixtures, doors and/or doorframes, window sills and frames, and other similar varnished, oiled, treated, coated, painted or unpainted and untreated wood or wood composition surfaces.

10. The compositions of claim 1 or claim 2 wherein the resulting cleaner/polish is useful for cleaning and/or polishing wood, parquet, linoleum and other flooring materials on floors including, but not limited to varnished, sealed, coated, painted and/or unfinished wood.

11. The compositions of claim 1 or claim 2 wherein the resulting cleaner/polish is useful for cleaning and/or polishing brass, copper, stainless or carbon steel, wrought-, cast- or other forms of iron or other metal and combination metal composition articles, said metal articles to include door knobs, lock frames, hinges and window frames; window accessories; furniture handles, corner protectors, window frames, cast iron skillets and/or cookware; also including metal on cars and boats.

12. The compositions of claim 1 or claim 2 wherein the resulting cleaner/polish is useful for cleaning and/or polishing cars, boats, surfboards, skateboards, motorcycles, bicycles, or skis and the like.

13. A method of cleaning and/or polishing articles of wood, flooring materials, articles of metal, cars, boats, surfboards, skateboards, motorcycles, bicycles, skis and the like comprising contacting said articles with the cleaning and/or polishing compositions of claim 1 or claim 2 involving contacting said article with the cleaning and/or polishing composition and after a certain efficacious amount of waiting time rubbing, scrubbing, buffing, or otherwise working said article with said composition with a cloth, metal, plastic or other intermediary material or materials, and then essentially leaving on whatever stays on the cleaned and/or polished article.

14. A method of cleaning and/or polishing articles of wood, flooring materials, articles of metal, cars, boats, surfboards, skateboards, motorcycles, bicycles, skis and the like comprising contacting said articles with the cleaning and/or polishing compositions of claim 1 or claim 2 and rubbing, scrubbing, buffing, or otherwise working said article with said composition with a cloth, metal, plastic or other intermediary material or materials, and after an efficacious time of intimate contact, wiping off said composition, optionally with an intermediary solvent such as water, alcohol, or other solvents or solvent combinations or some other cleaning composition.

\* \* \* \* \*